UNITED STATES PATENT OFFICE.

HUGO SCHWEITZER AND ARTHUR ZART, OF ELBERFELD, GERMANY, ASSIGNORS TO FARBENFABRIKEN VORM. FRIEDR. BAYER & CO., OF ELBERFELD, GERMANY, A CORPORATION OF GERMANY.

BLUE DYESTUFF.

1,088,735.   Specification of Letters Patent.   Patented Mar. 3, 1914.

No Drawing.   Application filed June 3, 1913.   Serial No. 771,533.

*To all whom it may concern:*

Be it known that we, HUGO SCHWEITZER and ARTHUR ZART, doctors of philosophy, chemists, citizens of the German Empire, residing at Elberfeld, Germany, have invented new and useful Improvements in Blue Dyestuffs, of which the following is a specification.

In United States Letters Patents 1,038,209 and 1,038,210 the manufacture and production is described of new azo dyestuffs which after dyeing or printing can be combined on the fiber with diazotized nitranilins, producing shades varying generally from red to violet to blue. The process for the production of these new azo dyestuffs consists in combining either one molecule or two molecules of the same or of different diazoazo compounds free from amino- and hydroxy groups with one molecule of 2.2'-dinaphthylamin-5.5'-dioxy-7.7'-disulfonic acid of the formula:

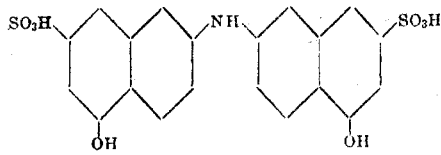

On dyeing or printing these dyes on cotton and combining them on the fiber with diazotized nitranilins shades generally varying from red to violet to blue are obtained which are remarkable for their fastness to washing and to light. The shades can be discharged to a pure white by means of hydrosulfite.

We have now found that bluer (navy-blue) dyes can be obtained by combining the dyes obtainable from one molecule of a diazotized aminoazo compound free from amino and hydroxy groups and one molecule of 2.2'-dinaphthylamin-5.5'-dioxy-7.7'-disulfonic acid with one molecule of diazotized 2.5.7- or 2.8.6-aminonaphthol sulfonic acid or with one molecule of diazotized 1-chloro-2.5.7- or 1-chloro-2.8.6-aminonaphthol sulfonic acid. The new dyes having most probably the formula:

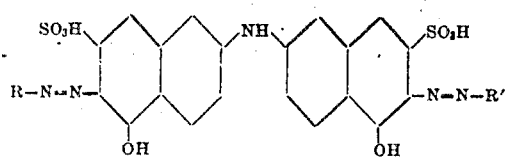

R meaning an azo compound being free from an oxy and amino group; R' meaning a substituted alpha-naphthol radical, such as the radical of a naphthol sulfonic acid and chloronaphthol sulfonic acid.

The new dies are after being dried and pulverized in the shape of their alkaline salts dark powders soluble in water with a violet to blue coloration; yielding upon reduction with stannous chlorid and hydrochloric acid a substituted amino-naphthol derivative, an amin, a diamin and 5.5'-dioxy - 2.2' - dinaphthylamin - 6.6' - diamin-7.7'-disulfonic acid. They dye cotton in blue shades which on being developed with diazotized para-nitranilin change into navy-blue shades fast to washing and to light.

In order to illustrate the new process more fully the following example is given, the parts being by weight:—452 parts of the aminoazo compound: para-nitrobenzene-ortho - sulfonic - acid - azo - 1 - naphthyl-amin-7-sulfonic acid are diazotized with hydrochloric acid and sodium nitrite and added to a solution containing an excess of sodium bicarbonate of 461 parts of 2.2'-dinaphthylamin-5.5'-dioxy-7.7'-disulfonic acid. The mixture is stirred for 6 hours until the combination is finished and the diazo compound obtained from 239 parts of 2.5.7-aminonaphthol-sulfonic acid is then added to it. It is heated to 75° C., the dye is salted out, filtered off and dried. The new dye having most probably the formula:

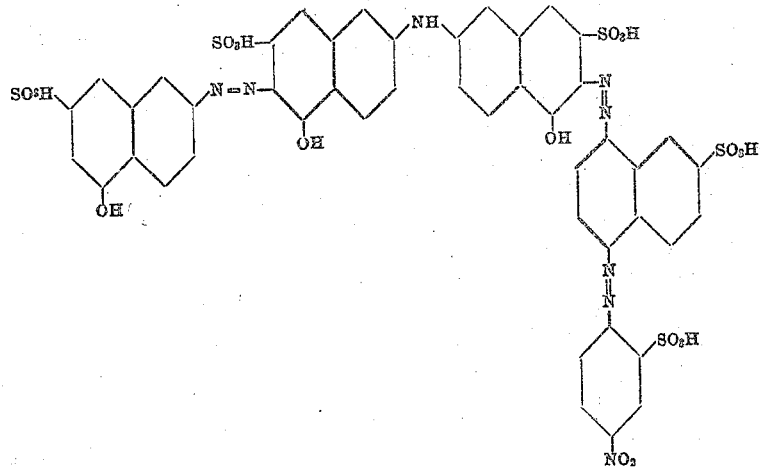

is in the shape of its sodium salt a dark powder which is easily soluble in water with a reddish-blue coloration and which is soluble in concentrated sulfuric acid with a greenish-blue coloration. Upon reduction with stannous chlorid and hydrochloric acid it is split up into 6.6'-diamino-5.5'-dioxy-2.2'-dinaphthylamin-7.7'-disulfonic acid, 2-amino-5-naphthol-7-sulfonic acid, para-phenylenediamin sulfonic acid and 1.4-naphthylenediamin-7-sulfonic acid. It dyes cotton blue.

The dyeing with this color may be carried out in the following way: A dye bath is prepared containing in 1000 parts of water, 4 parts of the above described dyestuff, 2 parts of calcined sodium carbonate and 30 parts of Glauber salt. 100 parts of cotton are entered, the bath is heated to boiling in the course of half an hour and the boiling is continued for half an hour. The goods which are dyed blue are then treated with diazotized para-nitranilin, exposed to air and rinsed. A deep navy-blue fast to washing is thus obtained which can be discharged to a pure white with hydrosulfites. The cotton can also be padded or printed with these dyestuffs and can then be combined on the fiber with diazotized nitranilins.

The process for the manufacture of the dyestuffs is carried out in an analogous manner if other components are used for the production of the aminoazo compounds of the above mentioned character i. e. being free from OH or additional $NH_2$ groups. For instance the para-nitranilin-ortho-sulfonic acid being a component of the aminoazo dye of the example may be replaced by chloro-anilin-sulfonic acids, chloro-toluidin-sulfonic acids, xylidin-sulfonic acids, naphthylamin sulfonic acids, etc., and the 1-naphthylamin-7-sulfonic acid being the second component of the aminoazo dye of the example may be replaced by para-xylidin, cresidin, alphanaphthylamin, etc.

We claim:—

1. The herein described new azo dyestuffs having most probably the formula:

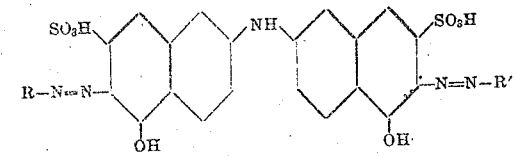

R meaning an azo compound being free from an oxy and amino group; R' meaning a substituted alpha-naphthol radical, which are after being dried and pulverized in the shape of their alkaline salts dark powders soluble in water with a violet to blue coloration; yielding upon reduction with stannous chlorid and hydrochloric acid a substituted aminonaphthol derivative, an amin, a diamin and 5.5'-dioxy-2.2'-dinaphthylamin-6.6'-diamin-7.7'-disulfonic acid; dyeing cotton blue shades which on being developed with diazotized para-nitranilin change into blue shades fast to washing and to light, substantially as described.

2. The herein described new dye having in a free state most probably the formula:

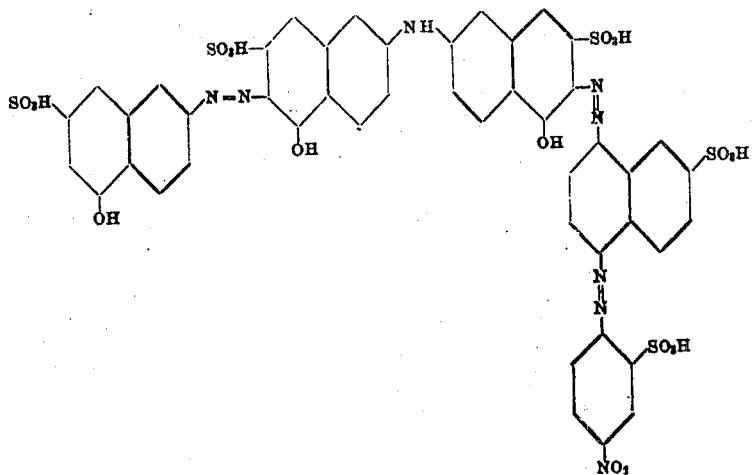

which is after being dried and pulverized in the shape of its sodium salt a dark powder which is easily soluble in water with a reddish-blue coloration and which is soluble in concentrated sulfuric acid with a greenish-blue coloration; yielding upon reduction with stannous chlorid and hydrochloric acid 6.6'-diamino-5.5'-dioxy-2.2'-dinaphthylamin-7.7'-disulfonic acid, 2-amino-5-naphthol-7-sulfonic acid, para-phenylene-diamin-sulfonic acid and 1.4-naphthylenediamin-7-sulfonic acid; dyeing cotton blue, which shade after being developed with diazotized para-nitranilin is navy-blue fast to washing which can be discharged to a pure white, substantially as described.

In testimony whereof we have hereunto set our hands in the presence of two subscribing witnesses.

HUGO SCHWEITZER. [L. S.]
ARTHUR ZART. [L. S.]

Witnesses:
ALBERT NUFER,
PAUL KAUFMANN.